United States Patent [19]
Howie

[11] Patent Number: 6,095,728
[45] Date of Patent: Aug. 1, 2000

[54] TRANSLATION APPARATUS

[76] Inventor: Frederick Victor Steven Howie, 62 Verbena Street, Mt Gravatt, Queensland 4122, Australia

[21] Appl. No.: 08/841,150

[22] Filed: Apr. 29, 1997

[51] Int. Cl.[7] .................................................. B23Q 17/22
[52] U.S. Cl. ............................ 409/214; 33/638; 33/642; 82/152; 408/16; 409/220; 409/235
[58] Field of Search ................................. 408/16, 87, 91, 408/234; 409/214, 218, 219, 220, 235; 82/132, 133, 152, 158; 33/628, 638, 640, 641, 642

[56] References Cited

U.S. PATENT DOCUMENTS

| | | | |
|---|---|---|---|
| 1,660,435 | 2/1928 | Craley | 409/218 |
| 2,289,874 | 7/1942 | Curtis | 409/218 |
| 2,293,733 | 8/1942 | Guttmann | 409/214 |
| 2,807,093 | 9/1957 | Sanchez | 22/642 |
| 3,292,267 | 12/1966 | Wilterdink et al. | 33/641 |
| 3,316,646 | 5/1967 | Novey | 33/626 |
| 3,566,827 | 3/1971 | Mosely et al. | 409/218 |
| 4,909,683 | 3/1990 | Vershowske et al. | 409/218 |
| 4,936,722 | 6/1990 | Schwinn | 33/642 |

FOREIGN PATENT DOCUMENTS

| | | | |
|---|---|---|---|
| 30047 | 6/1981 | European Pat. Off. | 33/642 |

*Primary Examiner*—Daniel W. Howell
*Attorney, Agent, or Firm*—Michaelson & Wallace; Peter L. Michaelson

[57] ABSTRACT

Translation means is provided for translating positional movement of the cutting tool [56] of a cutting machine [10] to a digital readout assembly [60] provided for monitoring the relative positions of the workpiece support means [14] and the cutting tool support [55] in a direction parallel to the positional movement. The translation means comprises a reader mounting [31] for mounting the position reader [15] of a digital readout assembly supported by a carrier assembly [16] which carries the reader [15] whereby it may move with the carrier assembly [16] or relative thereto in a direction parallel to the positional movement. Drive means such as a precision push-pull cable drive [20] is provided for translating the positional movement of the cutting tool [56] to movement of the reader mounting [31] relative to the carrier assembly [16].

10 Claims, 8 Drawing Sheets

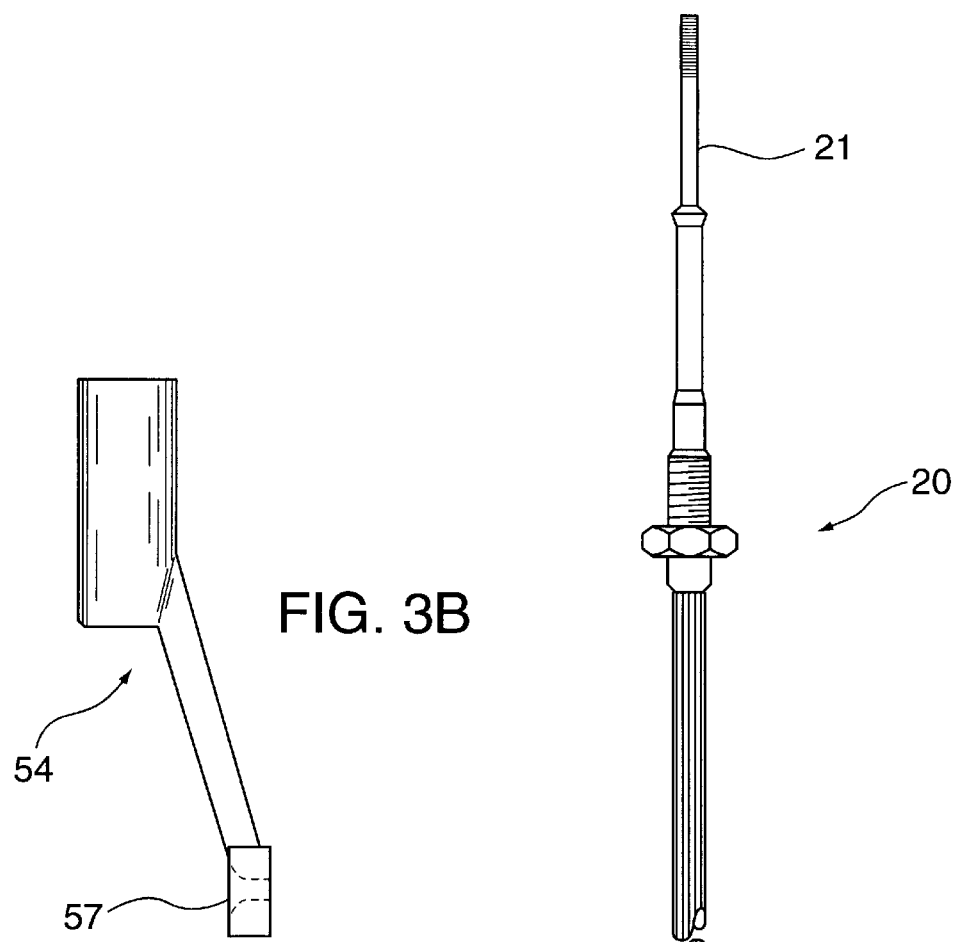
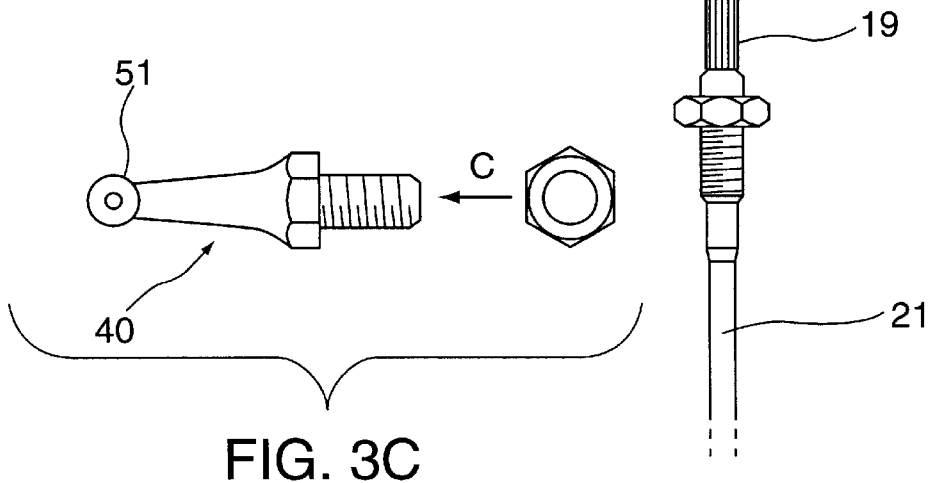
FIG. 3B
FIG. 3A
FIG. 3C

TRANSLATION APPARATUS

BACKGROUND OF THE INVENTION

1. Field of the Invention

This invention relates to translation apparatus.

This invention has particular reference to translation apparatus for use on milling machines and for illustrative purposes reference will be made hereinafter to such application. However aspects of this invention may have general application to monitoring cutting tool position in metal cutting machines such as milling machines and lathes. This invention also relates to cutting machines and, in particular, metal cutting machines incorporating such translation apparatus.

2. Description of the Prior Art

Frequently, during machining operations, an operator will utilize a variety of cutting tools to perform various operations on a workpiece. Typically, such actions necessitate the operator resetting the machine each time a tool is changed so that a datum position of a current tool may be established, whereby the operator may control the cutting tool position and thus a depth of cut. Where frequent tool chances are made, this becomes a time consuming and tiresome task, with increased potential for operator error.

In more recent times operators of such machines have benefited from use of digital readout displays providing accurate directly readable information as to the relative positions of the machine components. Such devices commonly include a digital readout assembly having a measuring scale fixed to the main frame of the machine, such as a column of a milling machine and disposed parallel to the movement to be monitored, and an associated reader head fixed to the adjacent machine component which moves relative to the main frame, such as a knee of a milling machine which is slidable along vertically extending slides on a column and supports a table or workpiece support.

In this manner, relative movement of the knee along vertically extending slides is monitored on the digital readout display. Such displays typically have a keypad for selecting their operating mode, such as for selecting zero positions of the knee relative to the column while others have a facility for inputting and selecting zero positions for several different length tools.

In milling machines, the cutting tool is attached to a quill spindle which may be manually advanced to engage the tool with a workpiece. A vertical scale is provided on the quill head whereby an operator may monitor the position of the quill head spindle relative to the quill head and thus deduce the depth of cut or position of the cutting tool relative to the workpiece for the mounted cutting tool.

It is possible to support a further digital readout scale and reader head on the quill head so that the vertical position of the quill spindle relative to the quill head may be readily monitored and displayed. Unfortunately, such arrangements are cumbersome and do not provide an instant positional reading of the cutting tool relative to the workpiece. Additionally, the provision of two digital readout scales and reader heads also involves additional costs and causes operator access limitations.

SUMMARY OF THE INVENTION

The present invention aims to provide translation means for cutting machines which will alleviate at least one of the above disadvantages and which will be reliable and efficient in use.

With the foregoing in view, this invention in one aspect resides broadly in translation means for translating positional movement of the cutting tool of a cutting machine to a digital readout assembly provided for monitoring the relative positions of the workpiece support means and the cutting tool support in a direction parallel to said positional movement, the translation means including:

a reader mounting for mounting a position reader of a digital readout assembly;

a carrier assembly for carrying the reader mounting whereby the reader mounting may move with the carrier assembly or relative to the carrier assembly in a direction parallel to the positional movement, and drive means for translating positional movement of the cutting tool to movement of the reader mounting relative to the carrier assembly.

Preferably, the digital readout assembly includes a fixed measuring scale and a reader head assembly moveable therealong although other forms of position monitoring as are known may be used for interfacing with a digital readout to provide an accurate positional references. Any suitable drive means may be utilized such as a linkage mechanism or a fluid drive. Preferably, however, the drive means is a low friction push-pull cable assembly in which, at one end of the cable assembly, the outer cable is anchored to the carrier assembly and the inner cable is anchored to the reader mounting. It is also preferred that the drive means be biased for constant loading and minimizing of errors. The biasing may be provided, for example, by weighting the apparatus where the reader head is vertically moveable or by spring biasing the reader head if it is disposed for horizontal movement.

With such arrangement, a displayed zero position will be maintained independent of the relative position of the workpiece support. That is, if, for example, a tip of a drill resting upon a knee mounted workpiece indicates a zero position, movement of the knee downward will move the reader head downward along the scale. However, if the drill bit is then wound down to again touch the workpiece, that movement will move the reader head back up the scale to its original position at which the zero position will again be indicated. Accordingly, once the zero position of a quill mounted tool is entered into the digital readout through the keypad or other means, that zero reading is maintained irrespective of the relative adjustment of the height of the workpiece support.

It will be seen that by utilizing the translation means of the present invention, a worker may utilize a number of cutting tools, enter their zero quill supported position into the digital readout and interchange those tools at will while maintaining an accurate digital readout of the position of each cutting tool relative to the workpiece independent of the position of the workpiece support or table which may be raised or lowered to any position to accommodate different length cutting tools.

In a preferred form of carrier assembly, the machine mounting is so formed that accurate mounting of the carrier assembly parallel to the adjacent measuring scale may be achieved irrespective of trueness of the adjacent surface to which the carrier assembly is to be mounted. This is suitably achieved by providing an X/Y plane adjustment at one end of the machine mounting and a Z plane adjustment at the other end. Suitably, the machine mounting is provided with an accurate linear carriage for cantilever support of the reader head.

It is also preferred that the translation means be utilized for monitoring movement which is normal to a workpiece table. However, if desired, the translation may be utilized to monitor movement which is not normal to a workpiece table or support axis. Furthermore, if desired such movement may be monitored to provide a direct measurement which is normal to a workpiece table or support axis such as, in the case of a translation means utilizing a push pull cable, by forming a mounting of the outer cable, associated with the movement being translated, as a laterally moveable mounting which restrains extension and retraction of the push pull cable to a direction parallel to workpiece table or support axis whereby the moveable mounting will move automatically causing direct monitoring in the axial direction.

In a further aspect this invention resides broadly in a vertical turret milling machine having:

a height adjustable workpiece support;

a cutting tool head supporting a vertically adjustable cutting tool spindle;

a readout measuring scale and reader head assembly adapted for monitoring relative movement of the workpiece support assembly to and from the cutting tool head, and translation means as variously defined above for translating positional movement of the cutting tool spindle to relative movement between the reader mounting and the carrier assembly. Preferably, the digital readout is of the type enabling several alternate zero positions for different length tools to be logged therein.

In yet a further aspect this invention resides broadly in a cutting machine having:

a cutting tool head supporting a cutting tool for positional movement to or from a workpiece;

adjustment means independent of the cutting tool head for adjusting the relative position of the workpiece support to the cutting tool head in a direction parallel to the positional movement;

a readout measuring scale and reader head assembly adapted for monitoring the relative position of the workpiece support to the cutting tool head in a direction parallel to the positional movement;

a reader mounting for mounting the position reader of a digital readout assembly;

a carrier assembly for carrying the reader mounting whereby the reader mounting may move with the carrier assembly or relative to the carrier assembly in a direction parallel to the positional movement, and drive means for translating positional movement of the cutting tool to movement of the reader mounting relative to the carrier assembly.

BRIEF DESCRIPTION OF THE DRAWINGS

In order that this invention may be more readily understood and put into practical effect, reference will now be made to the accompanying drawings which illustrate a typical embodiment of the invention and wherein:

FIG. 2 shows various components that collectively form the linear carriage assembly;

FIGS. 3A, 3B, and 3C collectively illustrate various components of the translation assembly;

DETAILED DESCRIPTION

Figure 1:
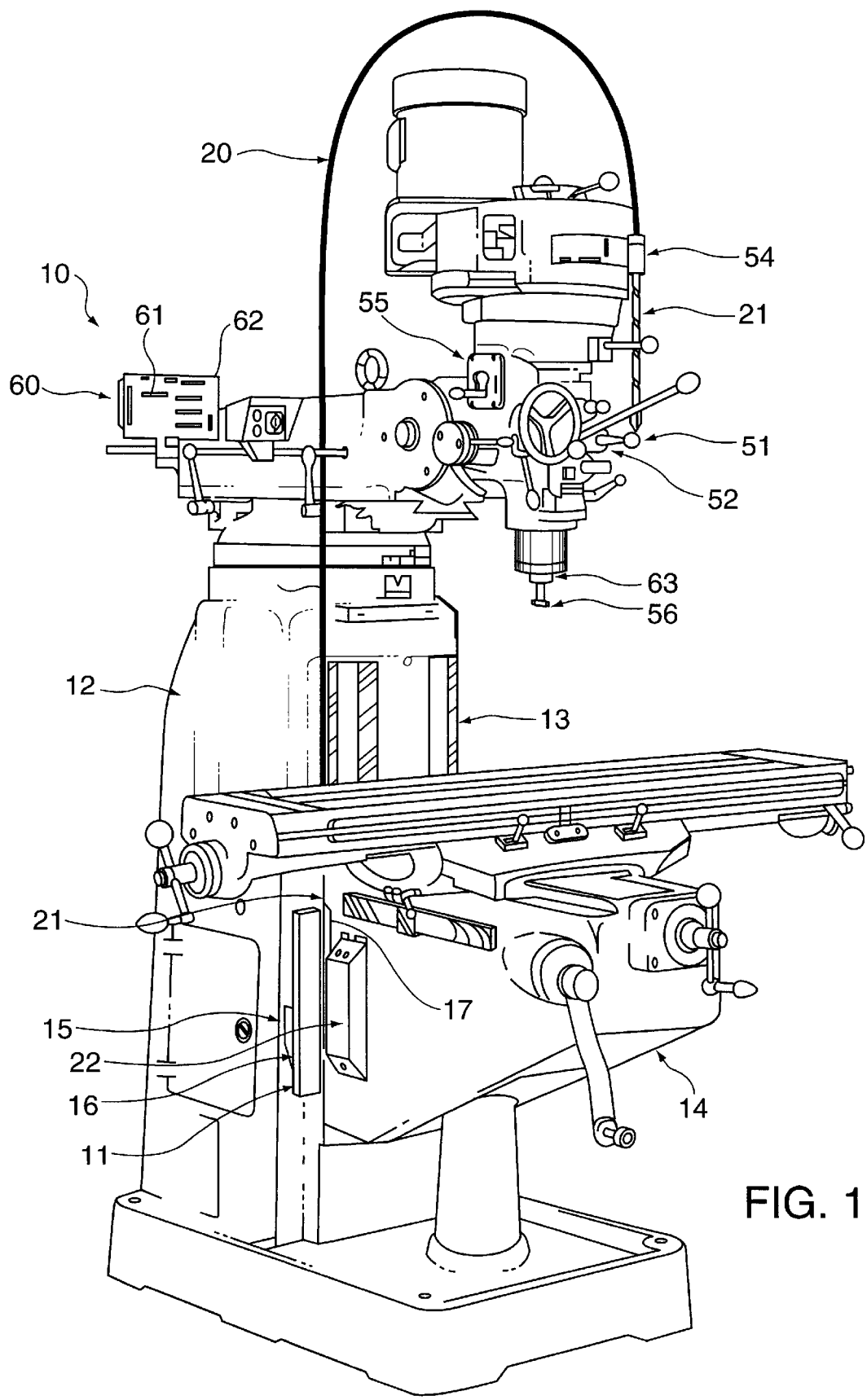
FIG. 1 illustrates application of a translation assembly according to one aspect of the present invention to a milling machine.
Figure 2A:
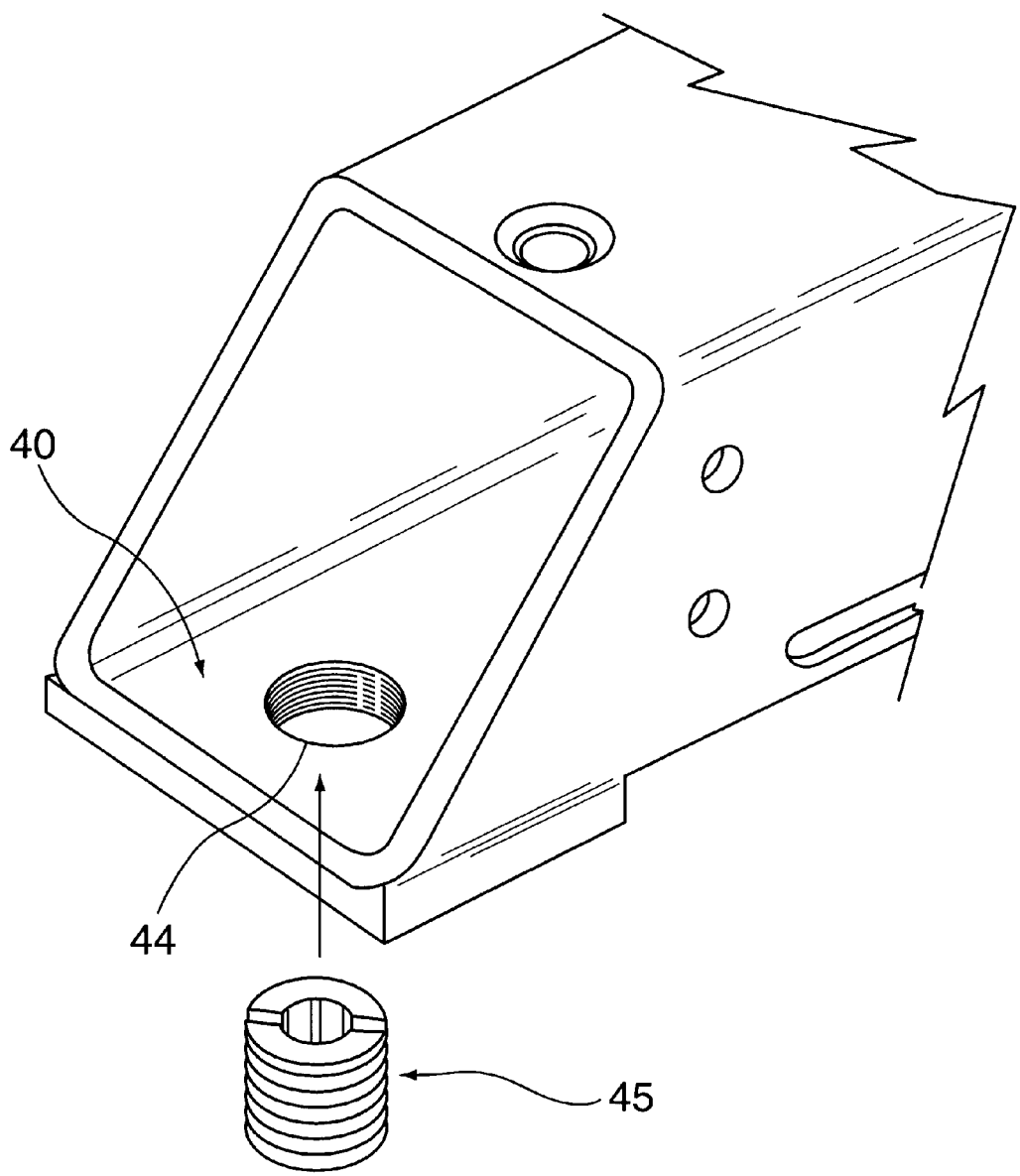
FIG. 2A is a bottom view of housing 22, along with its constituent components, taken in the direction of arrow A depicted in FIG. 2C.
Figure 2B:
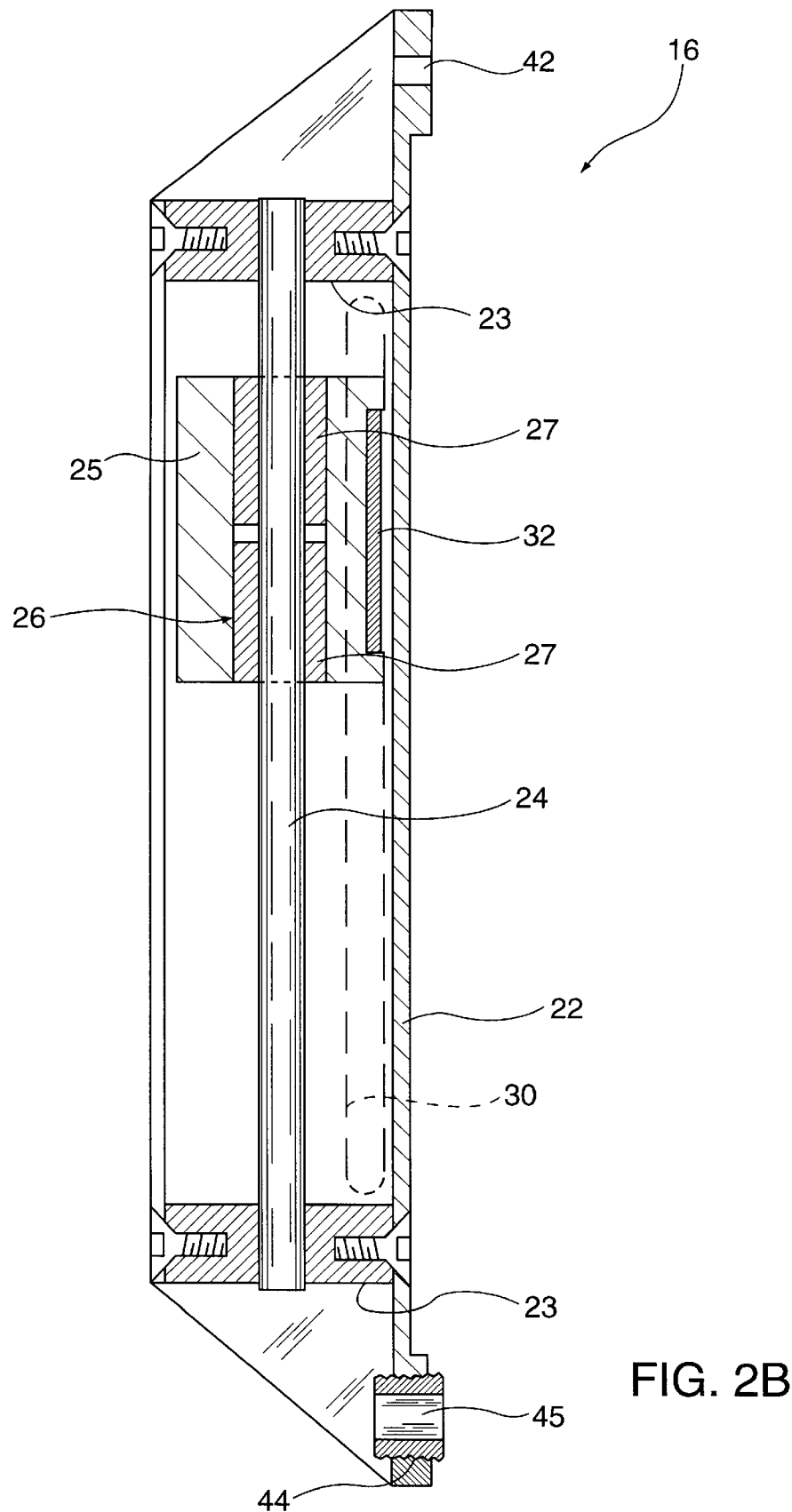
FIG. 2B is a cross-sectional view of house 22 taken along line B—B depicted in FIG. 4A.
Figure 2C:
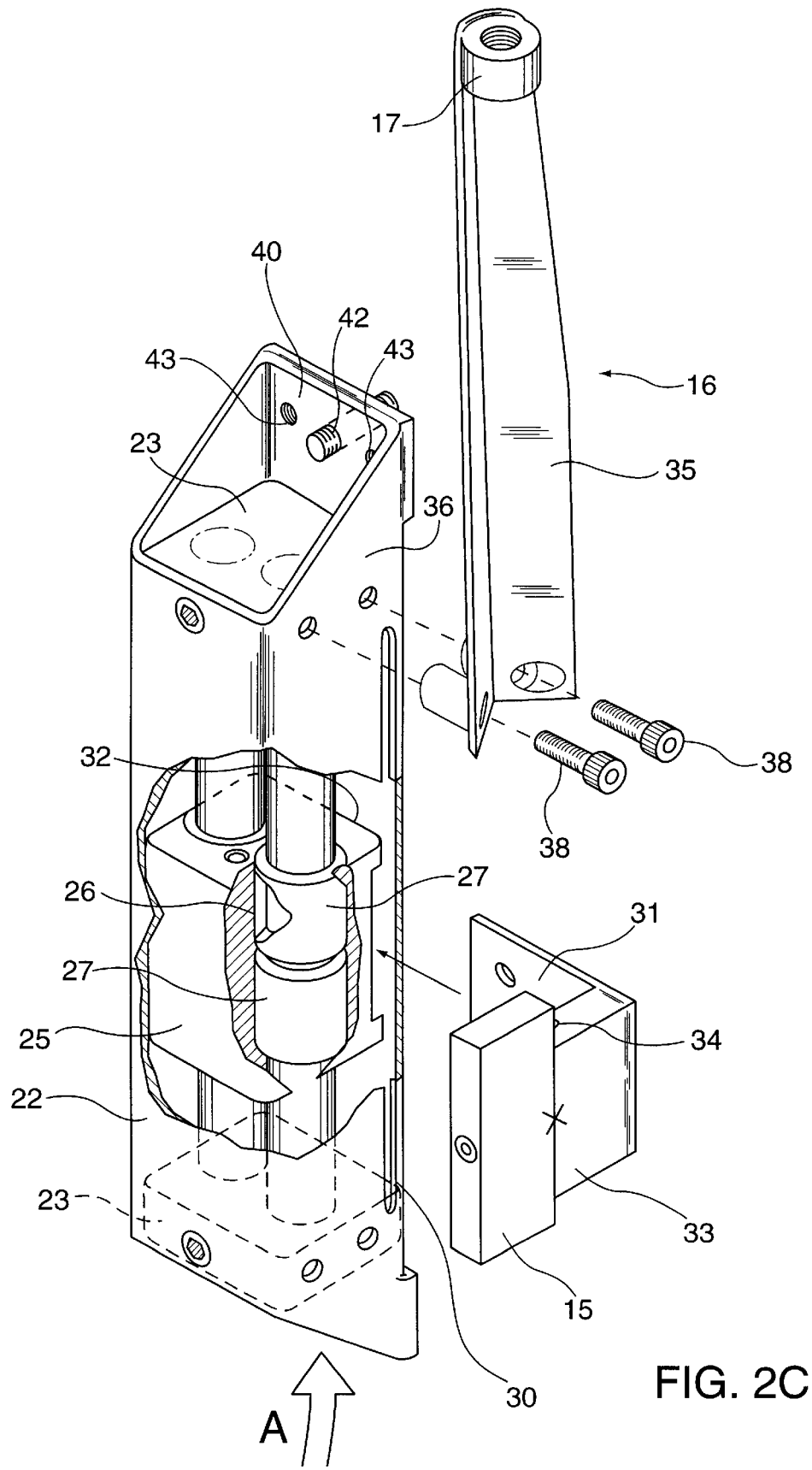
FIG. 2C is a cut-away perspective view of the components of the linear carrier assembly.
Figures 4A, 4B, 4C:
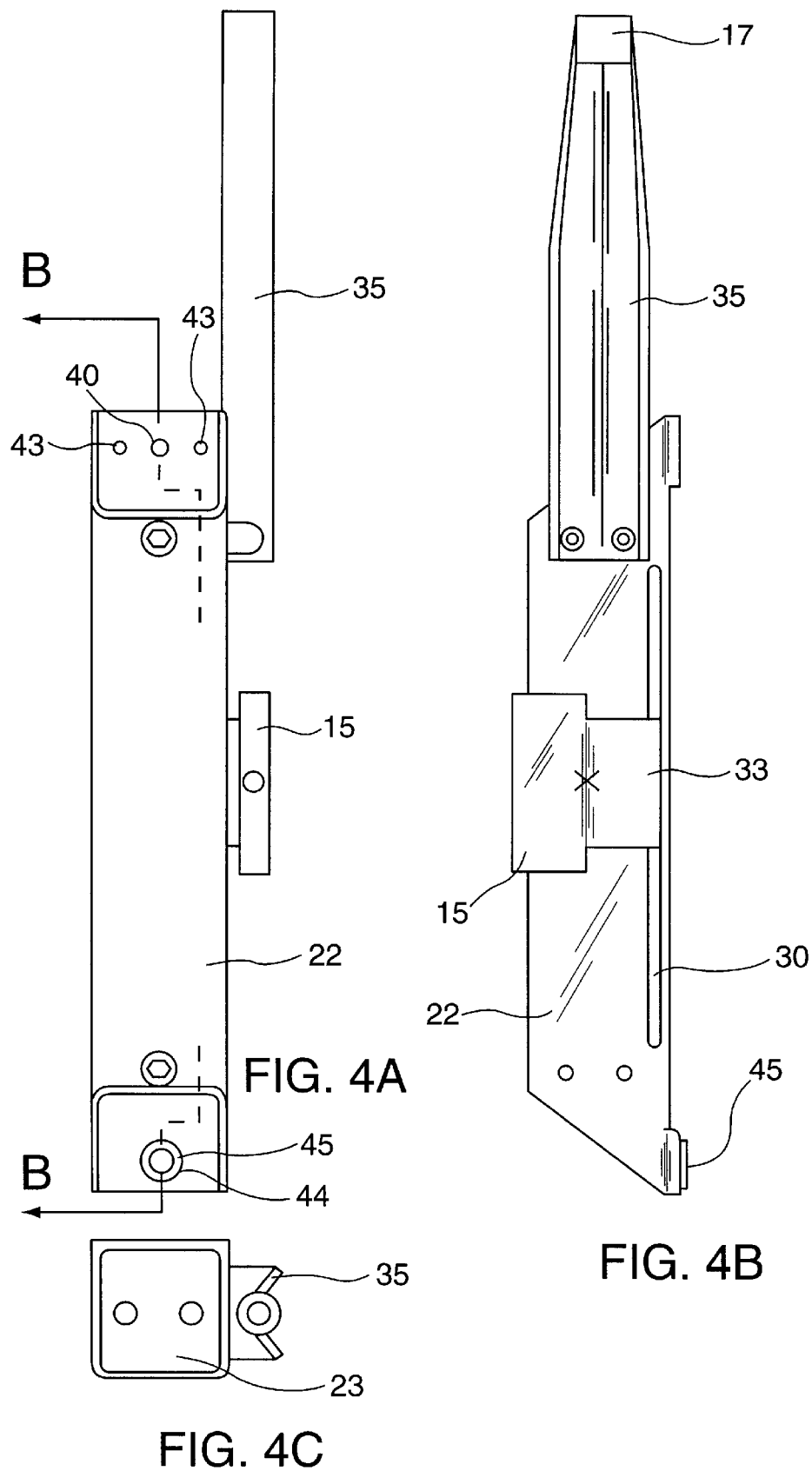
FIGS. 4A, 4B and 4C collectively illustrate, in front, side and plan elevations, respectively, the machine mounting of the linear carrier assembly.

A typical milling machine 10, as illustrated in FIG. 1 includes a digital readout measuring scale 11 mounted on the column 12 adjacent a vertical slide mounting 13 for the knee assembly 14. Typically, a reader head assembly 15 would be fixed to a side wall of the knee so as to overlie the measuring scale 11. However, in this illustration, the reader head assembly 15 is supported by a linear carrier assembly 16 forming part of the translation means 10 of the present invention.

Referring to FIGS. 2 and 2A–2C it will be seen that the linear carrier assembly 16 includes a box-section tubular machine mounting or housing 22 provided with upper and lower mounting plugs 23 which support columns 24 along which a relatively heavy mounting block 25 is slidable, guided by accurate linear bearings 27 supported within the parallel extending bores 26 extending vertically therethrough. The machine housing 22 is slotted at 30 to enable a carrier bracket 31 to pass into the housing 22 for attachment to the back face 32 of the mounting block 25.

The carrier bracket 31 is "L" shaped and includes an external body portion 33 which carries the reader head assembly 15 for movement alongside the measuring scale 11. The body portion 33 is also provided with an inner cable terminating socket 34. An upward extension mounting 17 is supported at the end of an angle-sectioned arm 35 which bolts through the side wall 36 of the housing 22 to the upper mounting plug 23 by bolts 38. This mounting 17 is provided for terminating the outer cable 19 of a precision low friction push/pull cable assembly 20 at a sufficient distance from the upper end of the slot 30 to enable an adequate range of adjustment of the inner cable to be accommodated. The inner cable 21 thereof is connected to the terminating socket 34. In this manner the relatively heavy mounting block 25 maintains a constant tension on the cable 21 to minimize inaccuracies.

As the inner cable 21 is secured to the carrier bracket 31, the reader head assembly 15 will move relative to the housing 22 when the inner cable 21 extends or retracts relative to the outer cable 19 which is terminated at the mounting 17.

The upper and lower ends of the housing 22 are bevelled to expose the upper and lower rear end wall portions 40 which are apertured in a manner which provides adjustable mountings for connecting the housing 22 to the knee 14 adjacent its interface with the column 12. These enable the rear wall 40 at its upper end to be connected in an orientation which is in a plane at right angles to the plane of the slides 13.

For this purpose, the upper mountings include a central relatively large diameter plain aperture 42, and outer smaller threaded apertures 43. The mounting at the lower end of the rear wall 40 is in the form of a relatively large threaded aperture 44 into which an apertured hollow plug 45 is engaged so that the stand-off of the rear wall 40 may be adjusted by bolting through the plug to maintain the back wall of the housing 22 in a vertical orientation.

Other components of the linear carrier assembly are shown in FIGS. 3A–3C. These include, as shown in FIG. 3A, the push/pull cable assembly 20, the inner cable mounting 40, as shown in FIG. 3C, for the end of the inner cable 21 remote from the carrier bracket 31. The left side of FIG. 3C shows a side view of mounting 40 with an end view thereof, taken in the direction of arrow C shown in this figure, being shown in the right side of this same figure and the associated outer cable mounting 54. It will be seen that the remote end of the inner cable 21 terminates at the mounting 40 in a nipple 51. The mounting 40 bolts to the movable scale indicator 52 of the quill mounting. The outer cable mounting 54, shown in FIG. 3B, bolts, through an apertured bore flange 57, to a fixed portion of the quill assembly 55 upon which the fixed portion of the quill scale 56 is mounted. The movable scale indicator 52 moves with the cutting tool 56 to provide a direct measure of the cutting tool position relative to its retracted position.

The digital readout measuring scale 11 is associated with a display 60 which includes a screen 61 and a keypad 62 for selecting the mode of the display and for inputting and recalling zero positions for several different length tools which are to be mounted in the quill spindle 63. Typically the digital readout measuring scale 11 is mounted at eye height for easy viewing by an operator.

It will be seen that as both the inner and outer cables of the push/pull cable assembly 20 are mounted to the linear carrier assembly 16, movement of the knee 14 relative to the column 12 will provide a change in the display as would conventional direct mounting of the reader head assembly on the knee. This occurs because any movement of the knee will not change the relative positions between the inner and outer cable and will thus cause the reader head assembly to move with the linear carrier assembly. However, if a cutting tool is secured in the quill spindle 63, operation of the feed for the quill spindle 63 will retract or extend the inner cable through the outer cable and cause relative movement between the reader head assembly 15 and the measuring scale 11 which will be reflected in the display 61. If the quill feed is moved to a selected datum or zero position with a specific cutting tool mounted, the mode of the display 60 can be selected to indicate a zero position for that cutting tool which will remain as a valid setting for the mounted workpiece.

Thereafter, that zero position will be maintained for that cutting tool relative to the knee irrespective of the adjustment of the knee relative to the column 12. This occurs in effect by an upward displacement of the knee assembly 14 necessitating a corresponding upward displacement of the cutting tool. The upward displacement of the knee assembly 14 will move the reader head assembly 15 upward along the measuring scale 11. Retraction of the cutting tool will cause extension of the inner cable 21 from the outer cable terminating socket 34.

If the retraction of the cutting tool is equal to the lifting of the knee assembly 14 then the downward movement the reader head assembly 15 resulting from extension of the inner cable 21 will be equal to the upward movement of the reader head assembly 15 and the digital display 60 will indicate the zero position.

Furthermore, any number of cutting tools may be secured in the quill spindle and adjusted for zero. Once so adjusted, they may be removed and replaced at will and provided the appropriate mode is selected, the display will provide an accurate zero position and/or relative position of the cutting tools relative to the a workpiece supported on the table of the knee assembly 14.

Figure 5:
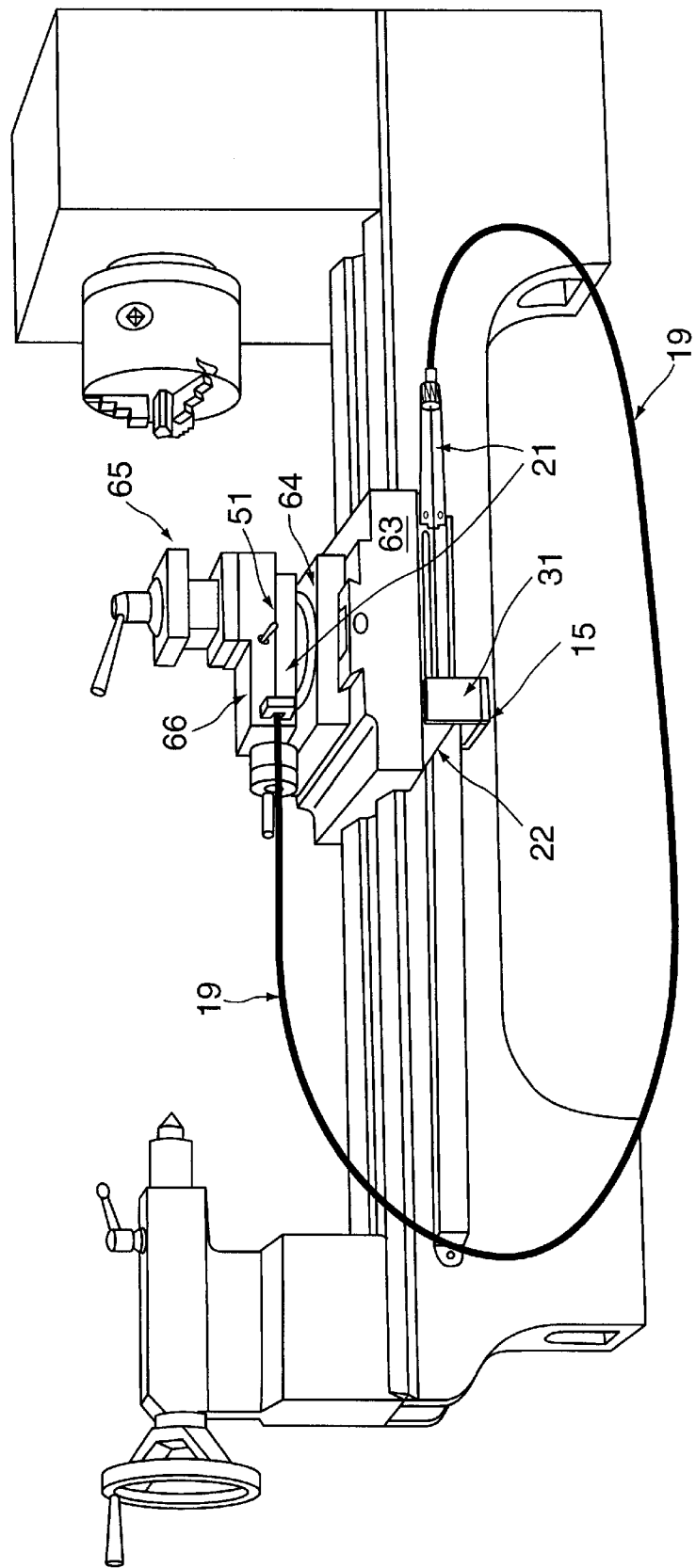
FIG. 5 illustrates a further embodiment of the invention applied to a lathe.

FIG. 5 illustrates the translation apparatus described above fitted to a conventional lathe, illustrated without the tailstock for clarity. The machine housing 22 is mounted to the underside of the longitudinal slide way 63 which supports the cross slide 64 for movement to and from the headstock. The cross slide 64 supports a compound tool rest 65 which includes a small slide 66. As the mounting block 25 is now supported for horizontal movement an internal spring is provided to bias the mounting block 25 in a direction away from the outer cable 19.

In this embodiment the outer cable 19 is terminated at one end at the housing 22 and at its other end on the cross slide 64. One end of the inner cable 21 attaches to the carrier bracket 31 for the reader head 15 whereby it is guided for movement along the linear measuring scale 11. The other end of the inner cable 21 attaches to nipple 51 mounted on the small slide 66 of the compound tool rest 65. Thus once adjusted for a zero position for a mounted tool, the display (not shown) will maintain a readout of the actual longitudinal position of the tool irrespective of the relative positions of the longitudinal slide way 63 and the small slide 66.

Figure 6:
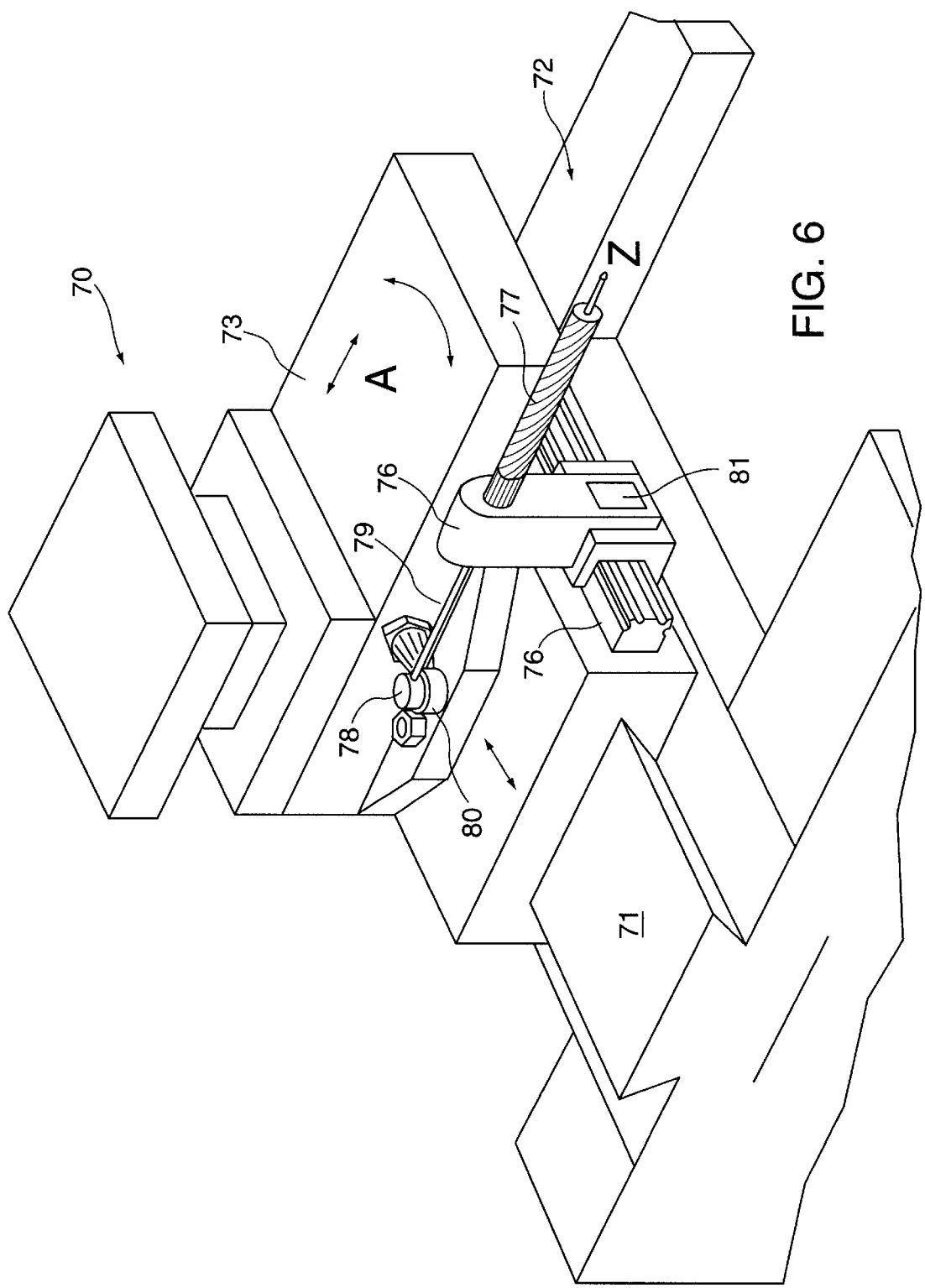
FIG. 6 illustrates yet a further variation of the invention adapted for monitoring the Z and X axis movements of a tool mount such as for a lathe tool holder which is capable of compound movement along the X and Z axes.

In the further embodiment illustrated in FIG. 6, it will be seen that a compound tool rest 70 is supported for operator or machine adjustment along an X-direction mounting slide assembly 71 and a Z-direction mounting slide assembly 72. The compound tool rest 70 includes a tool slide assembly 73 which is pivotable about the Y axis on the upper member of the X-direction mounting slide assembly 71 for compound movement of the tool in the X axis and Z axis directions. In such arrangement it is advantageous for an operator to be aware of the X and Z co-ordinates for accurate placement of the cutting tool.

According to this aspect of the present invention, the body of the tool mount assembly 70 supports a further linear slide rail 75 disposed on the upper member of the X-direction mounting slide assembly 71 and disposed parallel to the X axis and having a push/pull cable mounting 76 freely slidable therealong. The mounting 76 provides a fixed termination for the outer cable 19 of the a push/pull cable assembly having its opposite end connected to a reader head assembly as illustrated in FIG. 5.

A rod-like inner cable linear extension 79 has a terminal portion 78 connected to the pivot mounting 80, provided on the slide assembly 73 and freely pivotable about the Y axis direction. The linear extension 79 extends through the outer cable mounting 76 which accurately confines the linear extension 79 for movement in the Z axis direction whereby movement of the slide assembly 73 in the Z axis direction will be reflected in a corresponding movement of the inner cable 79 relative to the outer cable 77 to provide the appropriate linear measurement from a selected zero position on the digital readout display.

The pivot mounting 80 is length adjustable so that its pivot axis may be set to an equal distance from the Y pivot axis of the tool mount assembly 70 as the tool tip such that if the slide assembly 73 is pivoted about the Y axis, the resultant movement of the mounting 80 in the X direction will be reflected in a corresponding movement of the outer cable mounting 76 along the low friction linear slide 75. Suitably this movement is read by a further reader head 81 attached to the mounting 76 and connected to the display to provide digital readouts of both the X and Z axis movements of the tool mount assembly 70.

It will of course be realized that the above has been given only by way of illustrative example of the invention and that all such modifications and variations thereto as would be apparent to persons skilled in the art are deemed to fall within the broad scope and ambit of the invention as is defined in the appended claims.

The claims defining this invention are as follows:

1. Translation means for translating positional movement of the cutting tool of a cutting machine to a digital readout assembly provided for monitoring relative positions of a workpiece support means and a cutting tool support in a direction parallel to said positional movement, said translation means including:

a reader mounting for mounting the position reader of a digital readout assembly;

a carrier assembly for carrying the reader mounting whereby the reader mounting may move with the carrier assembly or relative to the carrier assembly in a direction parallel to said positional movement, and drive means for translating positional movement of the cutting tool to movement of the reader mounting relative to the carrier assembly.

2. Translation means as claimed in claim 1, wherein said digital readout assembly includes a fixed measuring scale and reader head assembly moveable therealong and said drive means is a precision push/pull cable assembly provided with biasing means for biasing either extension or retraction of an inner cable through an outer cable of the push/pull cable assembly.

3. Translation means as claimed in claim 2, wherein the reader mounting is supported by the carrier assembly for vertical movement and the reader mounting is biased by weight.

4. Translation means as claimed in claim 3, wherein the carrier assembly is adjustably mounted to said workpiece support assembly.

5. Translation means as claimed in claim 4, wherein the carrier assembly comprises, at one end thereof, a first adjusting device for adjusting movement of the reader mounting along an X/Y plane and, at another end of the carrier assembly, a second adjusting device for adjusting the movement of the reader mounting along a Z plane wherein the Z plane is substantially perpendicular to the X/Y plane.

6. Translation means as claimed in claim 5, wherein the carrier assembly supports the reader mounting in a cantilevered fashion and accommodates linear movement of the reader mounting while the reader mounting is supported in the cantilevered fashion.

7. Translation means as claimed in claim 6, wherein the carrier assembly comprises a housing having a guide post along which a mounting body is guided for linear movement by linear bearings, and wherein said reader mounting extends into said housing for cantilever support from said mounting body.

8. Translation means as claimed in claim 7, wherein the reader mounting terminates for the inner cable of a push/pull cable assembly and the outer cable terminates on an extension mounting fixed to said housing.

9. A vertical turret milling machine having:

a column supporting a height adjustable workpiece support;

a cutting tool head supporting a vertically adjustable cutting tool spindle;

a fixed readout measuring scale on the column and a digital position reader associated therewith for monitoring relative movement of the workpiece support assembly vertically along the column;

a reader mounting for mounting the digital position reader;

a carrier assembly for carrying the reader mounting whereby the reader mounting may move with the carrier assembly or relative to the carrier assembly in a vertical direction; and drive means for translating the vertical positional movement of the cutting tool to vertical movement of the reader mounting relative to the carrier assembly.

10. A cutting machine having:

a cutting tool head supporting a cutting tool for positional movement to or from a workpiece;

adjustment means independent of said cutting tool head for adjusting the relative position of the workpiece support to the cutting tool head in a direction parallel to said positional movement;

a readout measuring scale and reader head assembly adapted for monitoring the relative position of the workpiece support to the cutting tool head in a direction parallel to said positional movement;

a reader mounting for mounting the position reader of a digital readout assembly;

a carrier assembly for carrying the reader mounting whereby the reader mounting may move with the carrier assembly or relative to the carrier assembly in a direction parallel to said positional movement, and drive means for translating positional movement of the cutting tool to movement of the reader mounting relative to the carrier assembly.

* * * * *